Figure 1:
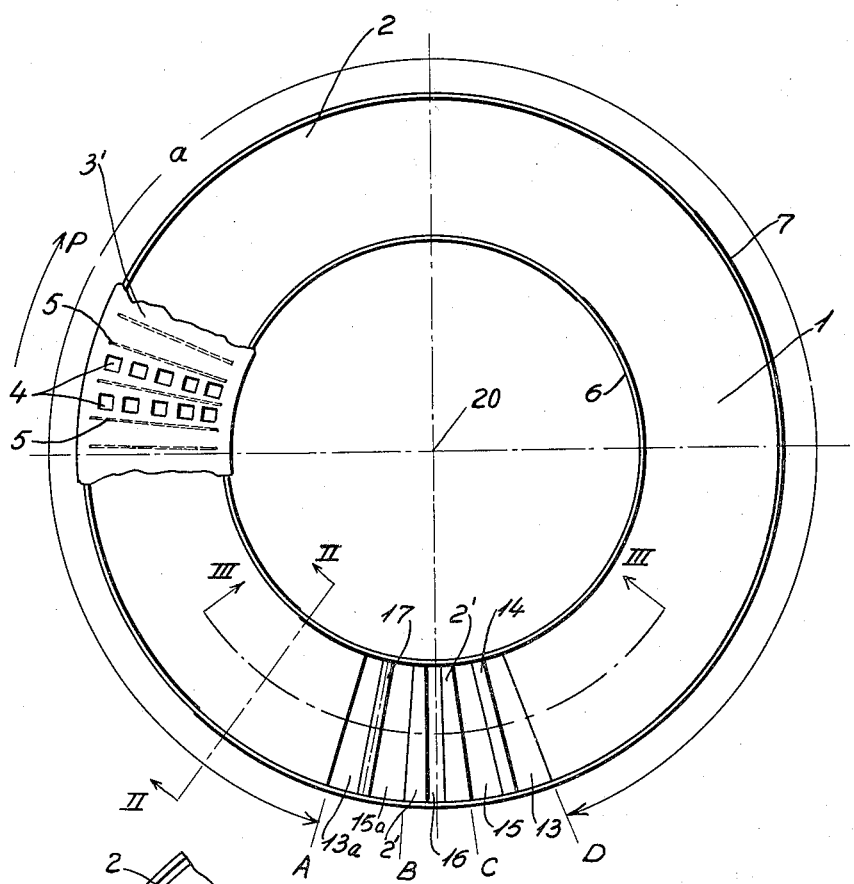

INVENTOR
Hans Gram
BY
Watson, Cole, Grindle & Watson
ATTORNEY

United States Patent Office 3,024,622
Patented Mar. 13, 1962

3,024,622
REFRIGERATING APPARATUS FOR PREPARING
FROZEN BODIES OF ICE-CREAM
Hans Gram, Vojens, Denmark, assignor to Brodrene
Gram A/S, Vojens, Denmark
Filed Nov. 10, 1958, Ser. No. 772,750
Claims priority, application Denmark Nov. 22, 1957
3 Claims. (Cl. 62—340)

This invention relates to a refrigerating apparatus for preparing frozen bodies of ice-cream and more especially the invention relates to the refrigerating unit of a machine of the kind comprising a cylindrical vessel, a circular table forming a cover on said vessel and arranged to be rotated stepwise about the axis of the vessel, a plurality of freezing pockets arranged in said table in annularly and radially disposed rows and extending down into said vessel, means for rotating said table stepwise, means for supplying alternately a freezing liquid and a thawing agent transversely through said vessel in different circumferential regions of same, and means for removing the superficially thawed ice sticks from said pockets in time-intervals between consecutive stepwise movements of said table.

In a known machine of the kind referred to above in which the annular vessel is arranged to be rotated stepwise together with the said table radially disposed partitions are arranged within said vessel between the radially disposed rows of the freezing pockets in order to cause the liquid freezing agent fed to any interval of the vessel bounded between two consecutive radial partitions to flow mainly in a radial direction through the vessel along the radial rows of the freezing pockets, which arrangement aims at the purpose of securing an effective utilization of the freezing action of the freezing medium and a uniform freezing of the contents of all of the freezing pockets in one and the same radial row of such pockets, irrespective whether the pockets are located in the innermost or the outermost end or in the intermediate portion of the radial rows of freezing pockets.

An arrangement of this kind is described in U.S. patent specification No. 2,246,941 and has proved to be effective provided that the number of circular rows of freezing pockets should not exceed five or six, however, on the other hand the presence of the said radial partition mounted within the said vessel necessitates a stepwise rotation of said vessel together with the table supporting the freezing pockets and this necessity is objectionable for the reasons that alternating accelerations and retardations of the rotary motion of the said vessel and the freezing liquid complicate the structure and the mounting of the vessel and additionally the presence of radially disposed partitions in the freezing vessel makes an effective cleaning of the vessel rather difficult.

In order to avoid these drawbacks it has been proposed to dispense with the said radially disposed partitions and to use a stationary freezing vessel which means a freezing vessel which should not partake in the stepwise rotative motion of the freezing table.

In a known refrigerating apparatus of this latter kind it has been proposed to spray the freezing agent and the thawing agent from the bottom of the vessel below the rotary table upwardly towards the pockets, and annular vessel serving then the purpose of receiving the liquid agents having been sprayed upon the freezing zone and the thawing zone respectively, from which zones the agents in question are returned to the respective sources from which they were fed to the refrigerating apparatus.

In a machine of this latter kind the utilization of the freezing effect is very unsatisfying and the whole arrangement of a machine of this kind is very unpractical and expensive.

Furthermore, instead of inserting radial partitions in the freezing and thawing zone of a refrigerating apparatus of the kind referred to it has been proposed to encase each individual radial row of freezing pockets in a separate casing attached to the bottom face of the rotating table and to cause the freezing liquid and the thawing liquid to flow to said casings within the freezing zone and the thawing zone of the apparatus respectively. In a machine of this kind the vessel surrounding the freezing pockets is a stationary one and serves the purpose only of receiving the liquid freezing agent and the thawing agent respectively, having passed the said separate casing within the freezing zone and the thawing zone respectively and to collect said liquids in separate compartments from which they are returned to the supply sources for the respective agents.

In a refrigerating apparatus according to the present invention comprising a stationary annular vessel, a rotatably mounted table covering said vessel and a plurality of annularly and radially disposed rows of freezing pockets extending from said table down into said vessel, a number of substantially radially disposed vertical walls are mounted upon the bottom face of said table between consecutive radial rows of freezing pockets, each substantially radially disposed wall extending down into said vessel nearly to the bottom of same in close proximity to the cylindrical side faces of the vessel, however without contacting said faces. Inlet apertures and outlet apertures for the freezing medium are arranged respectively in the innermost and the outermost cylindrical wall of said vessel within a considerable portion of a circumferential extension of same.

The freezing agent is according to the invention caused to flow in a substantially radial direction through each portion of said vessel bounded between two consecutive radially disposed walls within the freezing region of the apparatus comprising a considerably circumferential portion of the annular vessel. Within a further, however smaller circumferential portion of the said vessel one or more apertures for the supply of a thawing liquid to the external surfaces of the freezing pockets are provided in the bottom of said vessel from which aperture or apertures the thawing agent is sprayed upwardly against the freezing pockets passing said apertures during the stepwise rotation of said table. A further number of apertures are provided in the said bottom within the thawing zone and serves the purpose of returning the thawing agent used to a reservoir for same.

In a refrigerating unit of this kind it is possible to secure a very effective utilisation of the freezing agent and to secure a uniform freezing action upon the material disclosed in all of the freezing pockets even if the number of circular rows of freezing pockets is a considerable one, say seven to ten, or is a small one only.

If the number of annular freezing pockets in the table—forming together with the freezing pockets and the vessel referred to a freezing unit—is a considerable one, it might be desirable to arrange two substantially radially disposed vertical walls on the rotary table between each two consecutive radial rows of freezing pockets in which case the two radially disposed walls are each arranged in a position parallel to one of the said adjacent radial rows of freezing pockets so as to secure between each of said walls and the appurtenant radial row of freezing pockets a narrow space of a substantially constant width throughout the entire radial extension of said rows.

The freezing table comprising the freezing pockets and the substantially radially disposed walls attached to the underside of said table may, if desired, consist of several mutually interconnected segments of an annular body and the edges of the said radially disposed walls facing the bottom and the side walls of the annular vessel should preferably be in close proximity to the bottom face and the side faces respectively of the said vessel, however without contacting said faces.

In order to secure that the distance between the bottom edge of each of the said substantially radially disposed walls on the freezing table and the bottom of the vessel may be adjusted to any desired value, e.g. in order to secure that only a very small amount of the freezing agent should flow tangentially within the annular vessel through the narrow apertures between the bottom of the said vessel and the bottom edges of said radially disposed walls, the bottom of the said vessel may be arranged to be adjustable in a vertical direction thus allowing the level of said bottom to be adjusted to a proper small value, not allowing any important amount of the freezing agent to flow through the said apertures.

On the drawing—

Figure 4:
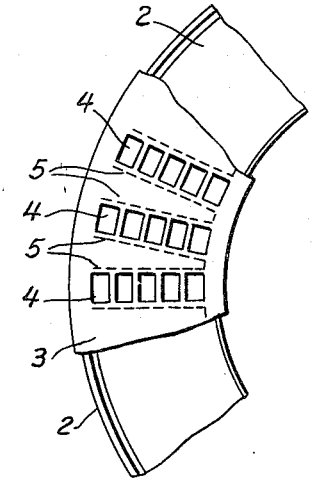
Figure 2:
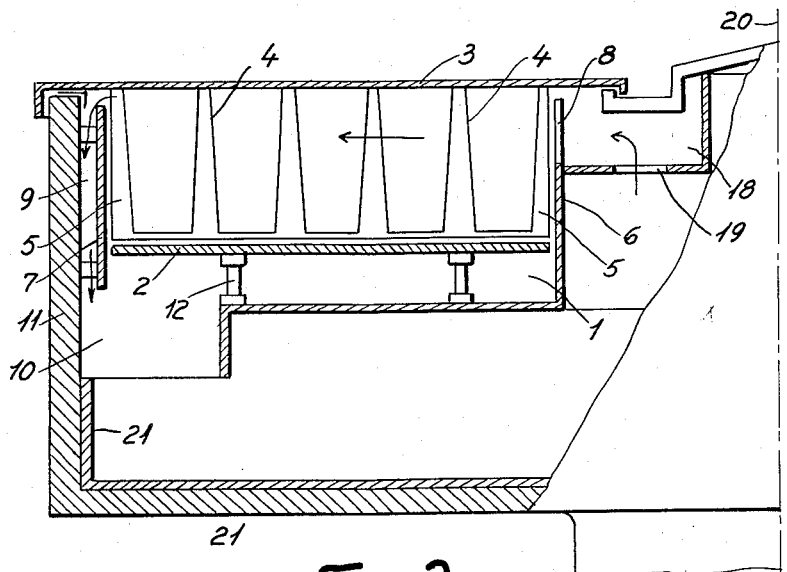
Figure 3:
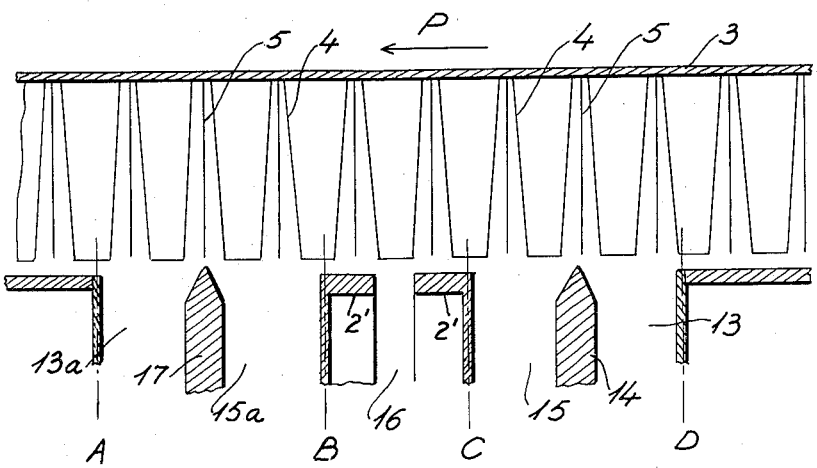

FIG. 1 is a plan view of the annular freezing vessel of a refrigerating apparatus according to the invention, FIG. 2 is in a larger scale a cross section along the lines II—II in FIG. 1, FIG. 3 is in a larger scale a longitudinal section along the lines III—III in FIG. 1 through the freezing vessel, and FIGURE 4 is a large scale view, partly in section, of a part of the apparatus of FIGURE 1.

1, FIG. 1, is an annular, stationary vessel, having—in the embodiment shown— a vertically adjustable bottom 2. 3 is a table, located above the stationary vessel 1 so as to form a cover to same. The table 3 is arranged to be rotated about the vertical axis of the annular vessel 1 and is fitted with a number of annular rows of pockets 4—said rows being so arranged that the said pockets adapted to receive each a certain amount of cream to be frozen—are also located in radially disposed rows. A few radial rows of these pockets are shown in FIG. 1 in which 3' is a fragment of the table 3 in FIG. 2, it should, however, be understood, that a number of corresponding radial rows of pockets are uniformly distributed over the entire peripheral extension of the annular table 3.

5 are vertical partitions or walls secured to the bottom face of the table 3 and extending down into the vessel 1. Said walls are arranged preferably—however not necessarily—radially so as to serve the purpose of dividing the annular interior of the vessel 1 into a number of compartments arranged side by side in the direction of the circumference of said vessel and disclosing each a few number—in the embodiment shown however a single one only—of the radial rows of freezing pockets. The said walls 5 should preferably extend so close to the bottom 2 and the side walls 6 and 7 of the vessel 1 as possible, without preventing the free passage of said walls along said faces during the rotation of the table 3.

The freezing agent is fed into the spaces bounded between any pair of consecutive walls 5 through apertures 8, FIG. 2, in the intermost cylindrical wall 6 of the vessel 1, FIGS. 1 and 2, and is caused to flow in a radial or substantially radial direction through said spaces onto the outermost cylindrical wall 7 of the vessel 1 and leaves the vessel 1 through an overflow aperture between the cover or table 3 and the upper edge of the wall 7, from which overflow aperture the said agent flows through a space 9, bounded between the said wall 7 and the outermost cylindrical stationary wall 11 of the refrigerating unit, down through a shaft 10 to a receiver 21, FIG. 2, from which the freezing agent in a well known manner, not shown, is returned into the freezing circuit.

The bottom 2 of the vessel 1 may form an integral portion of said vessel or may—as shown in FIG. 2, preferably be a separate body as distinct from the adjacent cylindrical walls 6 and 7 of the vessel 1 and may, if so, rest upon supports 12, arranged to be replaced—if desired—with other supports, having a different height, or having an adjustable height, in order to enable the bottom 2 to be elevated or lowered dependent on the depth of the freezing pockets and the height of the appurtenant walls of any of several mutually exchangeable freezing tables 5 which might be used separately in one and the same refrigerating unit, so that it should be possible to adjust the narrow space between the bottom edge of the walls 5 and the bottom 2 to the smallest possible size allowing free rotation of the table 3 relative to the bottom 2.

During stepwise rotation of the table 3 in direction of the arrow P in FIG. 1 different radial rows of freezing pockets 4 are moved one after the other through the angular region a, FIG. 1, within which region the freezing of the cream introduced in the freezing pockets 4 and the well known insertion of pins in the partially frozen cream—provided that an insertion of such pins is desired—is caused, e.g. as described in U.S. patent specification No. 2,246,941.

As appears from FIG. 1 the angular region a is extended through a considerable portion of the full circumference of the freezing table. The supply of cream to each radial row of freezing pockets takes place at the beginning of the motion of the said radial row of freezing pockets through the said angular region a which means when the said radial row of freezing pockets moves through the position indicated by the letter A in FIGS. 1 and 3—or maybe shortly after the said pockets having passed this position. When a radial row of freezing pockets 4 is moved through the position indicated by the letter D in FIGS. 1 and 3, the said row of freezing pockets moves across an aperture 13 in the bottom 2 of the vessel 1. Through this aperture 13 the residual amount of freezing liquid which might still be present between the said radial row of freezing pockets and the walls 5 adjacent said row may escape. During further rotary motion of the table 3 the just considered radial row of freezing pockets is moved across a vertcial partition 14, located below the said pockets between the aperture 13 and a further opening 15 in the bottom 2 as more especially referred to below, and in passing across aperture 13 the said radial row of freezing pockets moves into the thawing zone C—B. In this zone an opening 16, FIG. 3, is provided between two short integral portions 2' of the bottom 2, and through this opening 16 a thawing liquid is sprayed upwardly against the freezing pockets passing across said opening. The said thawing liquid, returning towards the bottom portions 2' by the influence of gravity may flow away through the opening 16 and a further opening 15a across which latter opening the radial row of freezing pockets in question moves onto the position A past a further vertically disposed partition 17 separating the bottom aperture 15a from a still further bottom aperture 13a aross which the freezing pockets are moved onto positon A, FIGS. 1 and 3. Within the region C—B the side faces of the frozen ice-cream sticks within the pockets passing said region are superficially thawed and sticks subsequently removed from the freezing pockets in a well known manner.

During the continuous stepwise rotation of the table 3 any residual amount of the thawing liquid, which might adhere to the external surfaces of the freezing pockets and to the walls 5 may drip off through an opening or channel 15a, as referred to above, and then the freezing pockets are in a condition to receive a further amount of cream to be frozen in the angular region a as referred to above.

In the first portion of the region a which means close to the position A, a freezing medium is supplied to the compartments bounded between any pair of radially disposed walls 5 in the vessel 1 and any small amount of such freezing liquid which should happen to escape through the narrow space between the bottom 2 and the bottom edge of the walls 5 in the neighbourhood of the position A would drain off through an opening or channel 13a and be received in a container 20, FIG. 2, referred to above.

The freezing liquid is in a well known manner fed to the freezing pockets from an annular or mainly annular introduction chamber 18, FIG. 2, to which the freezing liquid is supplied through a bottom opening 19 and from which said liquid enters the spaces between the walls 5 through the opening 8 in the wall 6.

Since each two consecutive, radial walls or partitions 5 in the embodiment shown in the drawing diverges in a direction away from the axis of rotation of the table 3, not only in relation to each other, but additionally in relation to the two adjacent radial rows of freezing pockets, it might be desirable in order to secure a uniform freezing effect upon any individual one of the freezing pockets, irrespective whether said pocket is located in the outermost or the innermost circular row of the pockets, to have two partitions 5 between any two consecutive radial rows of freezing pockets and to arrange each of said two partitions 5 in a position parallel to the adjacent radial rows of freezing pockets in order that the space bounded between each of such partitions 5 and the adjacent radial row of freezing pockets should have a constant width throughout its entire length in a radial direction. This would secure a uniform freezing action on any individual freezing pocket in the radial rows of such pockets irrespective whether the pocket is the outermost or the innermost or an intermediate one of the pockets in a radial row.

I claim:
1. A refrigerating apparatus for preparing frozen bodies of ice-cream having a stationary annular vessel, comprising two mutually concentric annular walls located one within the other and spaced radially from one another, an annular bottom located between said annular walls, a rotatably mounted cover on said vessel, a plurality of annularly and radially disposed rows of freezing pockets extending from said cover down into the space between said annular walls, a plurality of vertically disposed partitions mounted upon the underside of said cover between said radially disposed rows of freezing pockets and extending down into said vessel in close proximity to the bottom thereof and to the inner and outermost annular walls of said vessel out of contact with said bottom and said walls, the innermost of said annular walls having a plurality of apertures therein within a circumferential portion of said annular vessel for the supply of a freezing liquid to said portion of the annular vessel, the portion of the outermost annular wall facing said circumferential portion of the innermost of said walls having an overflow edge, and the further circumferential portion of said vessel having a number of apertures therein for the supply of a thawing liquid to the interior of said further circumferential portion of said vessel and additional apertures for the discharge of said thawing liquid from said further circumferential portion.

2. A refrigerating apparatus according to claim 1, in which the bottom of the annular vessel is vertically adjustable in relation to the annular side walls of said vessel.

3. A refrigerating apparatus for preparing frozen bodies of ice-cream having a stationary annular vessel, comprising two mutually concentric annular walls located one within the other and spaced radially from one another, an annular bottom located between said annular walls, a rotatably mounted cover on said vessel, a plurality of annularly and radially disposed rows of freezing pockets extending from said cover down into the space between said annular walls, a plurality of vertically disposed partitions mounted upon the underside of said cover between said radially disposed rows of freezing pockets and extending down into said vessel in close proximity to the bottom thereof and to the inner and outermost annular walls of said vessel out of contact with said bottom and said walls, the innermost of said annular walls having a plurality of apertures therein within a circumferential portion of said annular vessel for the supply of a freezing liquid to said portion of the annular vessel, the portion of the outermost annular wall facing said circumferential portion of the innermost of said walls having an overflow edge, and the further circumferential portion of said vessel having a number of apertures therein for the supply of a thawing liquid to the interior of said further circumferential portion of said vessel and additional apertures for the discharge of said thawing liquid from said further circumferential portion, said stationary annular vessel having a freezing zone, a thawing zone, and an intermediate zone between the freezing zone and the thawing zone and large emptying openings in a bottom member of the annular vessel to provide for the flash emptying of the pockets.

References Cited in the file of this patent

UNITED STATES PATENTS 2,246,941    Hoyer    June 24, 1941
2,791,890    Hoyer    May 14, 1957

FOREIGN PATENTS 713,319    Germany    Oct. 9, 1941